(12) United States Patent
Panek

(10) Patent No.: US 6,648,375 B1
(45) Date of Patent: Nov. 18, 2003

(54) PILOT INSERT SEAL FOR A TUBE FITTING

(75) Inventor: John G. Panek, Churchville, NY (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/211,605

(22) Filed: Dec. 15, 1998

(51) Int. Cl.[7] .............................................. F16L 39/00
(52) U.S. Cl. ................................. 285/124.1; 285/124.3; 285/370; 285/397
(58) Field of Search ................................ 285/24, 25, 26, 285/27, 28, 29, 124.4, 370, 397, FOR 118, 124.1, 124.2, 124.3, 124.5, 148.23, 371, 179, 382, 214, 382.2

(56) References Cited

U.S. PATENT DOCUMENTS

| | | | |
|---|---|---|---|
| 541,647 A | * 6/1895 | Welsh .................... 285/148.23 |
| 1,051,427 A | * 1/1913 | Mccluskey | |
| 1,188,485 A | * 6/1916 | Pruyn | |
| 2,409,865 A | * 10/1946 | Tewell ..................... 285/371 X |
| 3,406,989 A | * 10/1968 | Gross | |
| 3,674,292 A | * 7/1972 | Demler, Sr. .................. 264/249 |
| 3,842,870 A | * 10/1974 | Burgess ..................... 285/124.4 |
| 4,089,549 A | * 5/1978 | Vyse et al. ............... 285/124.4 |
| 4,114,930 A | * 9/1978 | Perkins et al. ........... 285/334.5 |
| 4,648,628 A | * 3/1987 | Meadows et al. ...... 285/133.11 |
| 4,887,850 A | * 12/1989 | Albrecht ................... 285/124.4 |
| 5,039,134 A | * 8/1991 | Meadows et al. ...... 285/133.11 |
| 5,135,267 A | * 8/1992 | Wilson ................... 285/148.13 |
| 5,188,495 A | * 2/1993 | Jones | |
| 5,354,101 A | * 10/1994 | Anderson | |
| 5,507,535 A | * 4/1996 | McKamey et al. .......... 285/168 |
| 5,692,783 A | * 12/1997 | Watanabe et al. ........ 285/124.4 |
| 5,743,327 A | * 4/1998 | Villa ....................... 285/370 X |
| 6,179,349 B1 | * 1/2001 | Guzzoni ..................... 285/370 |

FOREIGN PATENT DOCUMENTS

| | | | | |
|---|---|---|---|---|
| DE | 1932731 | * | 2/1970 | ................. 285/370 |
| DE | 2840962 | * | 4/1979 | ................. 285/370 |

* cited by examiner

Primary Examiner—Lynne H. Browne
Assistant Examiner—Aaron M Dunwoody
(74) Attorney, Agent, or Firm—Young & Basile, P.C.

(57) ABSTRACT

A cylindrical thin walled tube with a through bore extending its entire axial length between first and second opposed ends is individually mounted in a bore in a fitting, with an end portion of the tube extending outward from a land surface on the fitting. A groove is formed on the exterior of the tube between the first and second ends and receives a seal element which is engageable with the land surface on the fitting. At least one mounting barb is formed on the body, generally adjacent one of the ends of the body, for fixedly mounting the tube in the bore in the fitting. The tube may also be formed with multiple mounting barbs and multiple grooves, each groove receiving a separate seal element. The outwardly extending portion of the tube acts as a male pilot for guiding the precise alignment of a bore in a complimentary fitting into alignment with the bore in the fitting in which the tube is mounted.

20 Claims, 3 Drawing Sheets

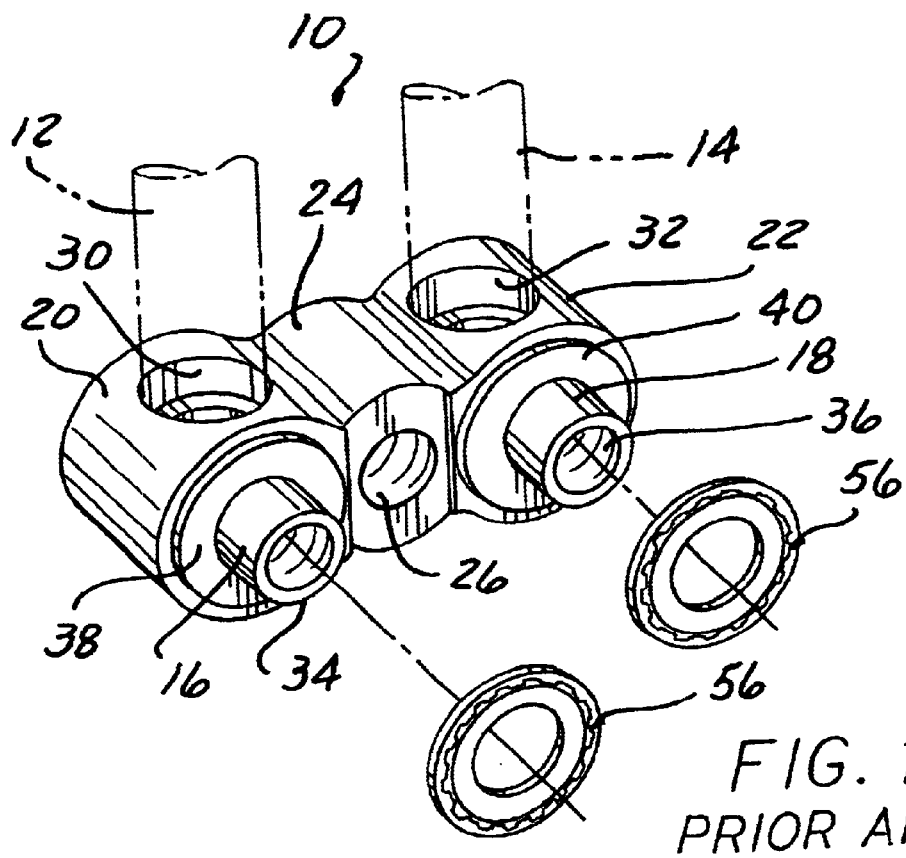
FIG. 1
PRIOR ART
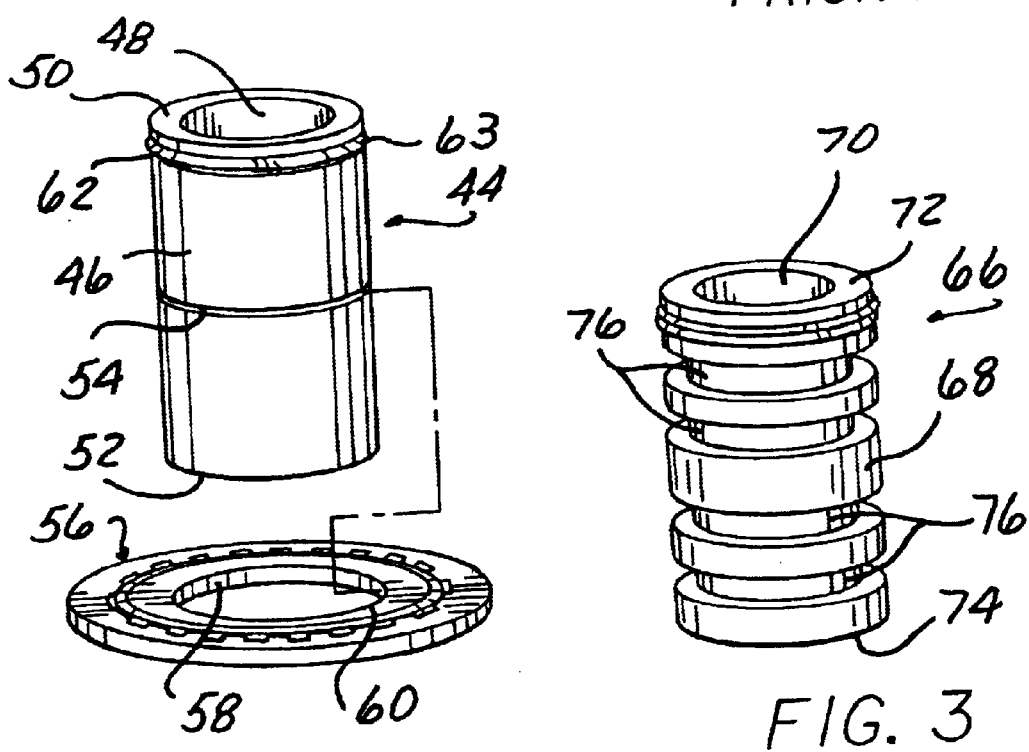
FIG. 2
FIG. 3

PILOT INSERT SEAL FOR A TUBE FITTING

BACKGROUND OF THE INVENTION

1. Field of the Invention

The present invention relates, in general, to fluid connectors and, more particularly, to fluid tubing connectors.

2. Background Description

Tubing connectors for threadless pipe, tubing, conduit and the like are well known and have been widely used in the automotive industry. A variety of terminating fastener fittings used as means to connect pipe, tubing, conduit and the like employ male pilot as a means for providing positive alignment of the mating fittings during their interconnection. Typically, a complete fastener fitting is formed of a male fitting and a female fitting and, in the majority of applications, a seal. A male land surface typically found in a terminating fastener fitting is either machined integral to the male tubing, formed, or formed and machined integral to the pipe or tube being terminated.

However, these known tubing connectors have disadvantages. In one example of a tubing connector wherein the male pilot is machined integral to the male fastener fitting from a one-piece block, the amount of material removed during the machining operation approaches the finish weight of the fitting in its final machine configuration. In another tubing connector configuration in which the male pilot is formed or formed and machined integral to the tube or conduit, the forming and machining operations, although well established in high volume manufacturing processes, are hampered by material variations that add considerable cost to the male fastener fitting. In all cases where tubes or conduits with dissimilar inside diameters are being joined, elaborate and costly end forming sequences are required for the dissimilar tubes.

Assembility is always an issue in using the male fastener fittings currently available. Sufficient clearances are required between the male pilots and the female land surfaces for assembly to be possible. Such clearances allow for imprecise alignment of the male and female fittings that could result in a no-build condition. The imprecise alignment also causes cross threading and crushed pilots in the fittings.

In all cases where elastomer seals are used in conjunction with the terminating fastener fittings, the opportunity for automated assembly of the seal is hampered by the vast number of configurations of tubing assemblies employing the terminated fastener fittings and the seal. As such, assembly efficiency of the seals is reduced and leaks resulting from missing or damaged seals is highly probable.

Thus, it would be desirable to provide a tubing connector which overcomes the problems encountered in the prior art tubing connectors described above. It would also be desirable to provide a tubing connector having a male pilot which can be constructed in an inexpensive manner without excessive material waste. It would also be desirable to provide a tubing connector having a male pilot which provides precise alignment of the female and male fittings and, also, enables a standard or fairly small number of standard size seals to be employed in the connectors.

SUMMARY OF THE INVENTION

The present invention is a pilot insert seal for use in tube connectors or fittings formed of two separate fitting elements which are joined together at common mating or land surfaces. Each of the fittings has at least one bore extending therethrough which is alignable with the bore in the opposed, mating fitting.

The pilot insert seal of the present invention includes a discrete body having first and second ends, a through bore extending between the first and second ends of the body, and means for fixedly mounting the pilot insert in the bore of one of the two fittings wherein one end of the pilot insert body extends outward from one fitting for guiding the insertion of the bore in the other fitting into alignment with the bore in the first fitting.

Seal means, mounted on the body for sealingly engaging one of the two fittings when the pilot insert is mounted in one of the bores in one of the two fittings. A groove is formed on an exterior of the body between the first and second ends of the body. The groove is preferably an annular groove. The seal means comprises an annular seal element mounted in the groove and extending completely about the entire exterior circumference of the body. Preferably, the seal means is mounted intermediate between first and second ends of the body.

The mounting means includes an annular projection formed on and extending outward from the body. The annular projection is preferably disposed adjacent to one of the first and second ends of the body.

A plurality of grooves can be spacedly mounted between the first and second ends of the body, each receiving a separate seal means.

In an alternate embodiment, the through bore extending through the body has a reduced inner diameter between the first and second ends of the body to form an orifice or restrictor.

A fitting assembly for joining two members in fluid flow communication is also disclosed. The fluid assembly includes first and second fittings having mating surfaces. A bore extends through each of the first and second fittings; a fluid conduit is mounted in the bore of each of the first and second fittings. A discrete pilot insert means is separably mounted in the bore of one of the first and second fittings, for guiding the alignment of the bores in the first and second fittings when the mating surfaces of the first and second fittings are brought into engagement. A seal is carried on the body and engageable with the mating surfaces of the first and second fittings.

The pilot insert seal of the present invention provides a low cost substitute for male pilots which are integrally machined from or formed in tube connectors or fittings. The discrete pilot insert seal enables a connector to be provided with a male pilot without the excess material waste associated with machining the male pilot integral to the fitting as in previously devised fittings. The pilot insert seal of the present invention also has better dimensional characteristics than pilots which are formed or formed and machined integral with the fittings to provide better alignment and assembility of the fittings at the moment sealing forces are applied to the elastomer seals carried on the fitting.

The present pilot insert seal also provides unique opportunity to combine small parts, such as elastomer seals, into an assembly with the pilot insert using automated methods. This further reduces the overall cost of the fitting assembly as well as reducing the incident of damage or missing seals. With better dimensional characteristics provided by the pilot insert seal, precise alignment of the bores in the two mating fittings is enhanced.

BRIEF DESCRIPTION OF THE DRAWING

The various features, advantages and other uses of the present invention will become more apparent by referring to the followed detailed description and drawing in which:

FIG. 1 is an exploded, perspective view of a prior art fitting having a male pilot;

FIG. 2 is an exploded, perspective view of a pilot insert seal constructed in accordance with the teachings of one embodiment of the present invention;

FIG. 3 is a perspective view of another embodiment of a pilot insert seal according to the present invention;

DESCRIPTION OF THE PREFERRED EMBODIMENTS

Figure 4:
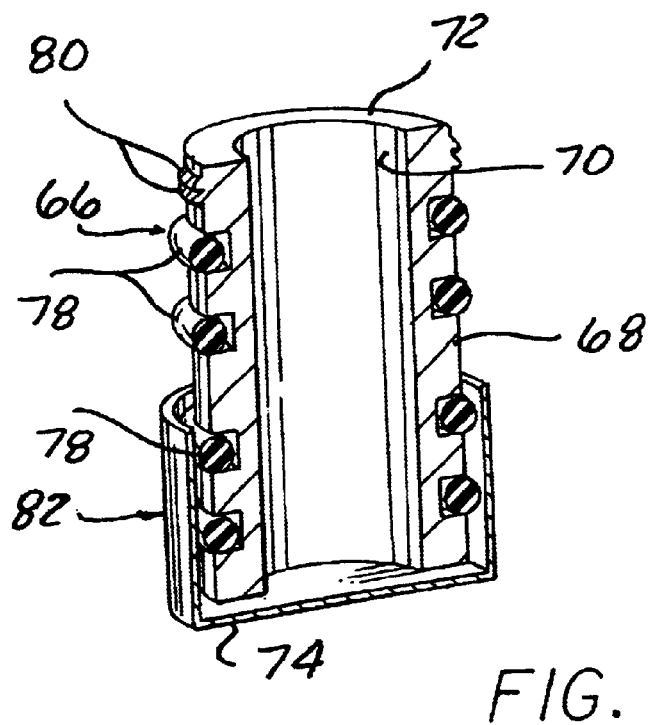
FIG. 4 is a longitudinally cross-sectioned, perspective view of the pilot insert seal shown in FIG. 3 with the seals mounted thereon and covered by a protective cap.

By way of background and for clarity in understanding the advantages and features of the present invention, a prior art fitting 10 having an integral male pilot and a seal is shown in FIG. 1. By example only, the fitting 10 is configured for use in a vehicle air conditioning system wherein the fitting 10 is mounted to one component of the air conditioning system, such as the evaporator, compressor, etc. and has individual conduits 12 and 14 brazed or soldered thereto for establishing a fluid flow path through the conduits 12 and 14 and a mating fitting, not shown, which engages male pilots 16 and 18 formed on the fitting 10.

The fitting 10 is formed of a one-piece body having two tubular portions 20 and 22 which are integrally connected by a central portion 24. A bore 26 extends through the central portion 24 for receiving a fastener to mount the fitting 10 on a suitable component, such as the evaporator or compressor of a vehicle air conditioning system.

Bores 30 and 32 are formed in each tubular portion 20 and 22, respectively, and are disposed in fluid flow communication with transversely extending bores 34 and 36, respectively. The bore 34 extends through the tubular portion 20 and an outwardly extending male pilot 16 of generally cylindrical form. It will be understood that the bores 30 and 32 may be formed through other surfaces of each tubular portion 20 and 22. Each of the bores 30 and 32 receives one of conduit 12 and 14 which is brazed, soldered, welded or otherwise fixedly secured in a fluid sealed condition in each bore 30 and 32.

A flat land 38 and 40 is formed on each tubular portion 20 and 22, respectively, to provide a smooth, flat surface for mating engagement with a complimentary formed fitting or connector, not shown.

The purpose of the male pilots 16 and 18 is to guide the interconnection of the fitting 10 with a mating fitting by engaging complimentary bores formed in the mating fitting to ensure proper alignment of the bores in the fitting 10 with the bores in the mating fitting. The mating fitting may be secured to the fitting 10 by means of a fastener extendable through an aperture in the mating fitting which is alignable with the aperture 26 in the central portion 24 of the fitting 10.

The fitting 10 is typically machined from a single block of metal, such as aluminum, etc. It is clear that a significant amount of material is removed from the single block to form the smaller central portion 24, the two tubular portions 20 and 22, the two bores 30, 34 and 32, 36 in each tubular portion 20 and 22, as well the lands 38 and 40 and the outward extending male pilots 16 and 18.

One solution to avoid this excessive amount of waste material while still providing a male pilot with simplified precise alignment of mating fittings is depicted in a first embodiment in FIG. 2. A pilot insert seal 44 is formed of cylindrical, thin walled tube 46 with an inside diameter bore 48 concentric with the outside diameter of the tube 46 and extending through the entire axial length of the tube 46 between a first end 50 and an opposed second end 52. A groove or recess 54 is formed on the exterior surface of the tube 46 at a suitable position between the first and second ends 50 and 52. Preferably, the groove 54 comprises an annular groove which is formed intermediately or substantially equi-distantly from the first and second ends 50 and 52. The groove 54 is adapted for receiving a seal means or element 56 which is shown in the form of a seal washer known in the art. The seal element 56 has a generally planar form with a circular cross section. A bore 58 is formed in the seal element 56 and has a inner diameter approximately the same as the outer diameter of the groove 54 for mounting the seal element 56 in the groove 54. An elastomeric member 60 is formed on preferably both sides of the seal element 56 adjacent to the bore 58 for forming a seal with the two opposed fittings, as described herein.

Means 62 are also provided for fixedly mounting the pilot insert seal 44 in a fitting. By example, the mounting means 62 comprises an annular, raised barb 63 having a constant outer diameter or an outer diameter formed by one or arcuate members or sections separated by arcuate discontinuities. The mounting means or barb 63 provides a press, interference fit between the tube 46 of the pilot insert seal 44 and the surrounding bore of a fitting in which the tube 46 is mounted.

It will be understood that one or more barbs can be disposed as a closely adjacent pair at one end of the tube 46 or at two widely spaced positions along the length of the tube 46 to fixedly mount the tube 46 in a bore of a fitting.

FIG. 3 depicts an alternate embodiment of a pilot insert seal 66 which is in the form of an axially extending thin walled tube 68 having a bore 70 extending axially between a first end 72 and an opposed second end 74 of the tube 66. A plurality of grooves 76, such as four by example only, are formed in the exterior surface of the tube 68 at spaced locations along the length of the tube 68 between the first and second ends 72 and 74. The grooves 76 are each designed to receive an elastomeric O-ring seal member 78 as shown in FIG. 4.

In this embodiment, a mounting means 80 is depicted as being formed of two closely spaced, annular, raised projections or barbs 80 which are disposed on the exterior surface of the tube 68 adjacent to, but spaced from the first end 72. The barbs 80 extend completely around the entire outer circumference of the tube 68.

FIG. 4 shows the pilot insert seal 66 with a protective cap 82. The cap 82 is broken away and is illustrated as covering only one end of the tube 68. It will be understood that the cap 82 will typically be provided in a length to surround the entire circumference of the tube 68 and extend substantially between the first and second ends 72 and 74 of the tube 68. The purpose of the protective cap 82 is to cover and protect the barbs 80 and the seal members 78 from damage during shipping and storage.

Figure 5:
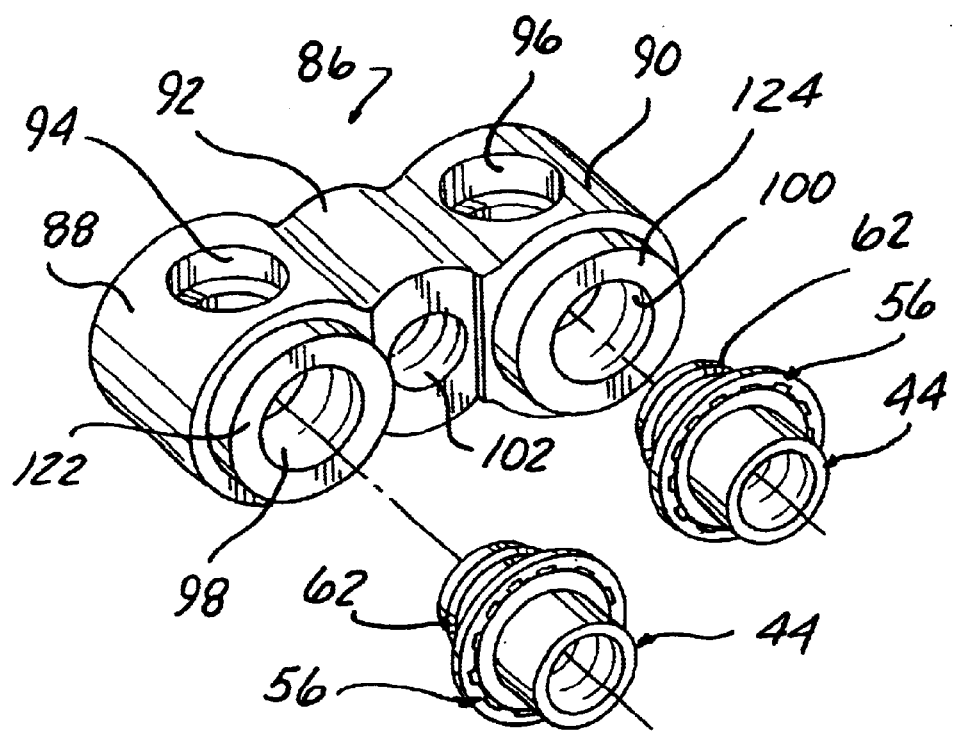
FIG. 5 is an exploded, perspective view of a fitting employing pilot insert seals according to the present invention.

Referring now to FIG. 5, there is depicted a fitting 86 which is similar to the prior art fitting 10 shown in FIG. 1.

The fitting 86 includes first and second tubular portions 88 and 90 which are integrally joined to a central portion 92. Bores 94 and 96 are formed in each tubular portion 88 and 90, respectively, and are disposed in fluid flow communication with interior, transversely extending bores 98 and 100 in each tubular portion 88 and 90, respectively. A bore 102 is formed through the central portion 92 for receiving a fastener used to secure fitting 82 to a mating fitting, not shown, and/or to a mounting surface, such as a vehicle air conditioning component, also not shown.

One pilot insert seal 44 is mounted in each bore 98 and 100 in the tubular portions 88 and 90. The mounting means or barb 62 on each pilot insert seal 44 engages the inner surface of the bore 98 and 100 in press fit to fixedly secure each pilot insert seal 44 in one of the bores 98 and 100. The seal element 56 mounted on each pilot insert 44 is positioned to engage the land surfacer 122 and 124 formed on the fitting 86. This still leaves an outer portion of the tube 46 extending outward from the fitting 86 and acting as a male pilot for aligning and engaging a bore in a mating connector as shown in FIG. 6.

Figure 6:
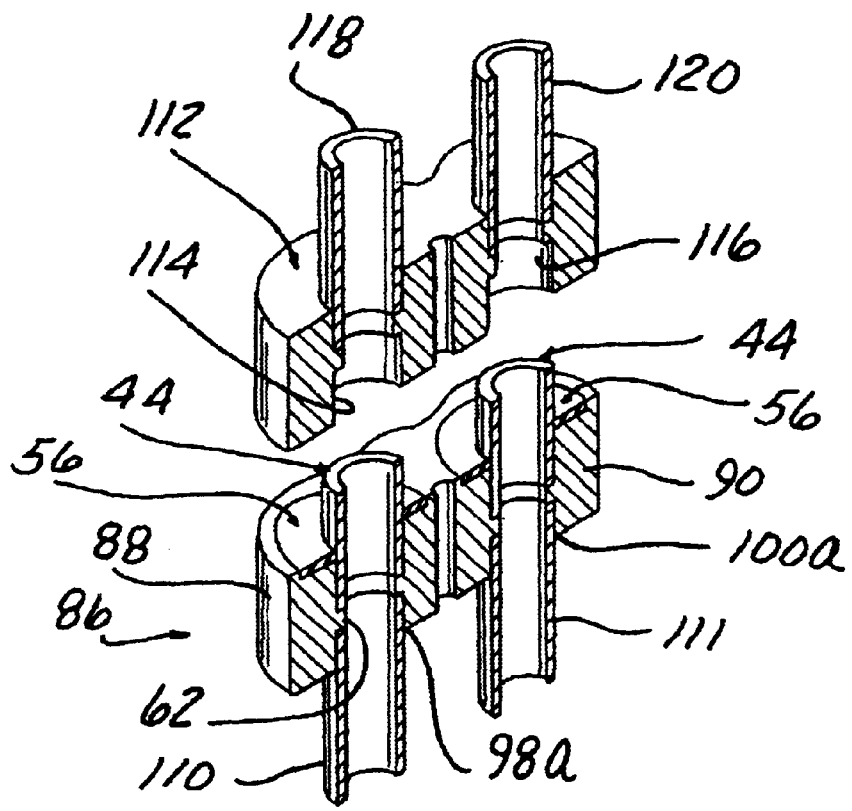
FIG. 6 is an exploded, longitudinally cross-sectioned view of the pilot insert shown in FIG. 2 configured for mounting to a typical fitting.

In FIG. 6, the fitting 86 is pictorially depicted with two internal through bores, each having one pilot insert seal 44 mounted therein. The seal element 56 on each pilot insert seal 44 is disposed in engagement with one side surface or land of the fitting 86. The metal tubes or conduits 110 and 111 are mounted in the bores 98a and 100a in tie fitting 86 in fluid flow communication with each pilot insert 44.

The mating connector 112 is similar to the fitting 86 and has two tubular portions, each having a through bore 114 and 116, respectively, extending therethrough. Conduits 118 and 120 are fixedly mounted by brazing, soldering, welding or other suitable means in each bore 114 and 116, respectively. The portion of each bore 114 and 116 opening to the opposite surface of the fitting 112 engages the male pilots extending outward from the land or mating surfaces the fitting 86 to guide the bores 114 and 116 into engagement with the male pilots 44 and thereby disposing the tube 118 in fluid flow communication with the tube 110 and the tube 120 in fluid flow communication with the tube 111.

Figure 7:
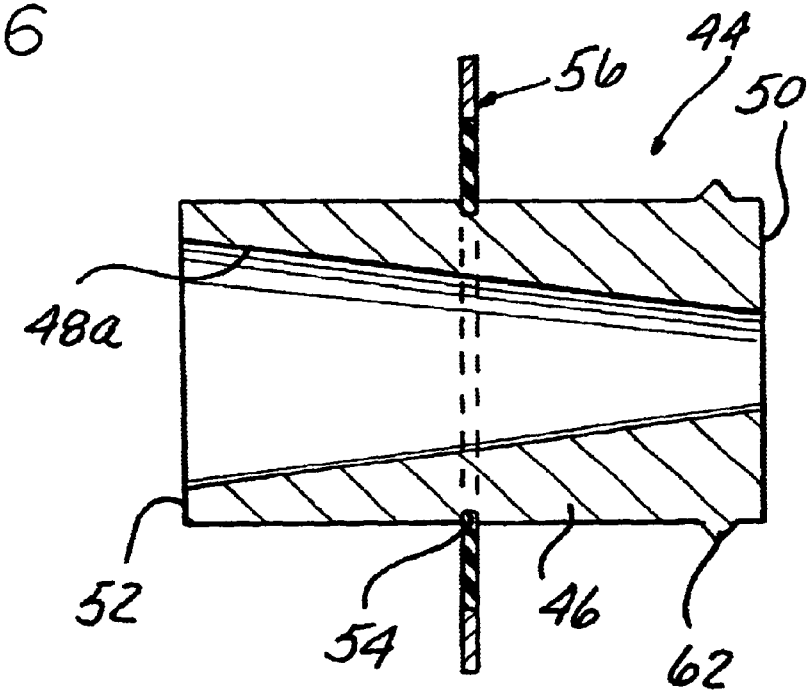
FIG. 7 is a cross-sectional view through the pilot insert seal shown in FIG. 2 having a restricted diameter bore.

FIG. 7 shows a modification to the pilot insert seal 44. In this modification, the tube 46 of the pilot insert seal 44 still includes the annular groove 54 which receives the seal element 56 and at least one mounting means or annular barb 62. However, in this embodiment, the bore 120 which extends between the first and second ends 50 and 52 is formed as a restrictor or orifice bore. By example, the inner diameter of the bore 120 at the second end 52 of the tube 46 is larger than the inner diameter of the opposed first end 50 of the bore 48a at the first end 50 of the tube 46. Although not shown, the bore 48a could have a large diameter at the second end 52 and a small diameter or orifice at a position between the ends 50 and 52, with a constant diameter from the orifice to the first end 50. This provides a restriction which acts as an orifice or venturi as well as providing interconnection between bores or tubes of two different diameters.

In summary, there has been disclosed a unique pilot insert seal which is fixedly mountable in a bore in a fitting. The pilot insert seal can be inexpensively constructed and, since it is mounted as a separate member in a fitting, the cost for machining or manufacturing the fitting is substantially reduced by a significant reduction in material wastage, etc.

What is claimed is:

1. A pilot insert for interconnecting fluid carrying bores in two joinable fittings, the pilot insert comprising:
   a discrete body having first and second ends, a through bore extending between the first and second ends of the body, wherein the through bore extending through the body has a reduced inner diameter between the first and second ends of the body;
   means immediately adjacent one end for fixedly mounting the pilot insert in the bore of one of the two fittings wherein the other end of the pilot insert opposite from the mounting means extends outward from the one fitting for guiding the insertion of the bore in the other fitting into aligament with the bore in the one fitting; and
   seal means, mounted on the body, for sealingly engaging one of the two fittings when the pilot insert is mounted in one of the bores in the one of the two fittings, the seal means spaced axially further from the one end than the mounting means.

2. The pilot insert of claim 1 wherein the bore in the body is larger at one end of the body than at an opposite end of the body.

3. An apparatus for joining two conduits in fluid flow communication, the apparatus comprising:
   a fitting body with a nonlinear bore extending through the body defining a first port and a second port;
   a first fluid conduit mountable in one port of the bore in the fitting body;
   a discrete pilot insert means having first and second ends, the first end separably mounted in the other port of the bore of the fitting body, the second end for guiding alignment of a second conduit with respect to the other port of the bore of the fitting body when the second end is separably mounted in a bore of the second conduit; and
   at least one outwardly extending circular ridge immediately adjacent only the first end and integral with the pilot insert means for fixedly mounting the pilot insert means in the other port of the bore of the fitting body.

4. The apparatus of claim 3 further comprising:
   a seal element carried on the pilot insert means and engageable with one of the fitting body and the conduit.

5. The apparatus of claim 4 further comprising:
   a groove formed on an exterior of the pilot insert means for receiving the seal element therein.

6. The apparatus of claim 5 wherein the groove is an annular groove, and the seal element includes a annular seal element mounted in the groove and extending completely about an exterior circumference of the pilot insert means.

7. The apparatus of claim 4 wherein the seal element is mounted intermediate between first and second ends of the pilot insert means.

8. The apparatus of claim 4 further comprising:
   a plurality of grooves spacedly mounted between the first and second ends of the pilot insert means, each of the grooves receiving a separate seal element.

9. The apparatus of claim 4 wherein the seal means comprises a seal washer.

10. The apparatus of claim 4 wherein the seal means comprises an O-ring.

11. The apparatus of claim 3 further comprising:
    means for fixedly mounting the pilot insert means in the bore of the fitting body.

12. The apparatus of claim 11 wherein the mounting means comprises an annular projection formed on and extending outward from the pilot insert means.

13. The apparatus of claim 12 wherein the annular projection is disposed adjacent to one of the first and second ends of the pilot insert means.

14. An apparatus for joining two conduits in fluid flow communication, the apparatus comprising:
- a fitting body with a nonlinear bore extending through the body defining a first port and a second port, wherein the bore extending through the fitting body has a reduced inner diameter between the first and second ports of the fitting body;
- a first fluid conduit mountable in one port of the bore in the fitting body; and
- a discrete pilot insert means having first and second ends, the first end separably mounted in the other port of the bore of the fitting body, the second end for guiding alignment of a second conduit with the other port of the bore of the fitting body when the second end is separably mounted in a bore of the second conduit.

15. The apparatus of claim 14 wherein the bore in the fitting body is larger at one end of the fitting body than at an opposite end of the fitting body.

16. The apparatus of claim 3 further comprising:
- seal means, mounted on the pilot insert means, for sealingly engaging one of the two ports in the fitting body when the pilot insert means is mounted in one of the ports of the fitting body; and
- means for fixedly mounting the pilot insert means in one port of the bore of the fitting body, wherein one end of the pilot insert means extends outward from the one port for guiding the insertion of a conduit over the pilot insert means to engage with the fitting body in alignment with the port of the bore in the fitting body.

17. An apparatus for interconnecting at least two fluid conduits in fluid communication with one another comprising:
- a fitting having an exterior surface, at least one passage extending through the fitting along a nonlinear path to define a first port and a second port through the external surface of the fitting at opposite ends of the passage;
- at least one pilot insert having an elongate body with an outer surface, each body having a first end engageable through one of the first and second ports into the passage, a second end operably engageable within a fluid conduit to be connected to the fitting, an aperture extending between the first and second ends of each body for placing a connected fluid conduit in fluid communication with the passage through the fitting, each body further having at least one annular ridge projecting radially outwardly from the outer surface immediately adjacent to only the first end and integral with the elongate body, the first end insertable within one of the first and second ports with a remaining portion of the body extending outwardly from the fitting; and
- at least one seal mountable on the outer surface of the body interposed between the at least one annular ridge and the second end for sealing the fitting with respect to the body.

18. The apparatus of claim 17 wherein the seal engages the exterior surface of the fitting.

19. The apparatus of claim 17 wherein the seal engages an interior surface of the passage adjacent one of the first and second ports.

20. The apparatus of claim 17 further comprising:
- at least one groove formed on the outer surface of the body for receiving the circumferential annular seal.

* * * * *